(12) United States Patent
Carmon et al.

(10) Patent No.: US 6,470,400 B1
(45) Date of Patent: Oct. 22, 2002

(54) APPARATUS FOR PACING CYCLE STEALS FROM A DATA PROCESSOR AND METHODS FOR IMPLEMENTING THE SAME

(75) Inventors: Donald Edward Carmon, Raleigh; Frank Edward Grieco, Apex; Llewellyn Bradley Marshall, IV, Cary, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/338,675

(22) Filed: Jun. 23, 1999

Related U.S. Application Data

(62) Division of application No. 08/915,703, filed on Aug. 21, 1997, now Pat. No. 5,978,867.

(51) Int. Cl.⁷ .............................................. G06F 13/14
(52) U.S. Cl. ........................... 710/25; 710/112; 710/22; 709/400
(58) Field of Search ............................... 710/25, 112, 22, 710/113; 709/400

(56) References Cited

U.S. PATENT DOCUMENTS

| | | | |
|---|---|---|---|
| 4,038,642 A | 7/1977 | Bouknecht et al. | 364/900 |
| 4,181,938 A | 1/1980 | Suzuki et al. | 364/200 |
| 4,246,637 A | 1/1981 | Brown et al. | 364/200 |
| 4,275,440 A | 6/1981 | Adams, Jr. et al. | 364/200 |
| 4,339,793 A | 7/1982 | Marenin | 364/200 |
| 4,417,304 A | 11/1983 | Dinwiddie, Jr. | 364/200 |
| 4,514,823 A | 4/1985 | Mendelson et al. | 364/900 |
| 4,975,832 A | 12/1990 | Saito et al. | 364/200 |
| 5,384,906 A * | 1/1995 | Horst | 709/400 |
| 5,485,613 A * | 1/1996 | Engelstad et al. | 707/206 |
| 5,493,664 A * | 2/1996 | Doi | 711/100 |
| 5,539,916 A * | 7/1996 | Yamasaki et al. | 710/22 |
| 5,978,867 A * | 11/1999 | Carmon et al. | 710/25 |
| 5,982,814 A * | 11/1999 | Yeh et al. | 375/222 |
| 6,085,218 A * | 7/2000 | Carmon | 709/107 |

* cited by examiner

Primary Examiner—Jeffrey Gaffin
Assistant Examiner—Abdelmoniem Elamin
(74) Attorney, Agent, or Firm—J. Bruce Schelkopf

(57) ABSTRACT

An apparatus and method are implemented to track and manage system cycles stolen from a data processor by other processors in a multiprocessor data processor system. The apparatus and method maximize data throughput and minimize unused cycle resources within the multiprocessor data processing system.

2 Claims, 3 Drawing Sheets

APPARATUS FOR PACING CYCLE STEALS FROM A DATA PROCESSOR AND METHODS FOR IMPLEMENTING THE SAME

This application is a divisional of application Ser. No. 08/915,703 filed on Aug. 21, 1997, now U.S. Pat. No. 5,978,867.

TECHNICAL FIELD

The present invention relates in general to data processor systems, and more particularly, to a method and apparatus for managing cycle steals in a data processor system.

BACKGROUND INFORMATION

In data processor systems having multiple processors, devices must be employed to allocate cycle resources between processors. A resource manager performing this function by allocating cycle resources to a data processor can easily track some of these cycle resources. Cycles used for code execution, data direct memory access (DMA) cycle steals (cycles unavailable to the data processor because of competition for a common resource), and other hardware services are easily tracked and accounted for because they are either periodic or predictable. However, cycles stolen because of asynchronous accesses to cycle resources by a second processor (such as a host personal computer) are not as easily tracked or managed.

Traditionally, the cycles stolen by the second processor have been limited by having the second processor pace itself through software timing loops in which it is assumed that each access to the data processor "steals" a constant number of cycles. This approach provides a crude method of estimating the worst case cycle steal threshold. As a consequence, reduced data throughput, and unused cycle resources result. Moreover, because the software timing loops are usually based on the second processor's system clock, typically a host processor's system clock which is different from the data processor system clock, the host's software is often required to perform a calibration step in order to adjust the timing loop counts.

Therefore, there is a need in the art for circuitry and methods that allow the second processor to precisely and deterministically limit and track all cycles stolen from the data processor core. Such circuitry and methods would provide a device for obtaining the maximum data throughput for a given cycle resource allocation. The same circuitry and methods would also eliminate the necessity for the software running on the second processor to perform a calibration to adjust the software timing loop counts.

SUMMARY OF THE INVENTION

The previously mentioned needs are fulfilled by the present invention. The invention tracks and deterministically limits all cycles stolen from the data processor over periods of time in which data processor resources are accessed by other processors. The invention accomplishes this by employing a cycle steal pacing counter which accumulates clock cycles during time intervals in which the data processor is being held, that is, instruction execution by the data processor stopped, because of system memory access by another processor. All such clock cycles are accumulated by the cycle steal pacing counter during a time interval corresponding to the period of an interrupt clock which is the basis for scheduling data processor tasks.

Access to data processor cycle resources is controlled by the value of the number of stolen clock cycles contained in the cycle steal pacing counter. In the time interval determined by the period of the interrupt clock, the processor seeking access to data processor cycle resources can access the cycle count value contained in the cycle steal pacing counter. This value is then used by the software controlling the access-seeking processor to limit the access to data processor cycle resources. Access limitation using software running on the accessing processor is a feature of the present invention.

The use of software in managing cycle resource accesses adds to the versatility of the invention. The algorithm controlling access to data processor cycle resources, a pacing algorithm, can be defined to best meet the needs of the data system design. During a period of time in which cycle steals by the accessing processor are inhibited because its allocation has been reached, the software can perform other activities. In contrast, a "hardware only" solution would stall the accessing processor, not allowing any background processing in the accessing processor. Thus, the present invention is advantageous over the use of hardware alone to do the access pacing.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
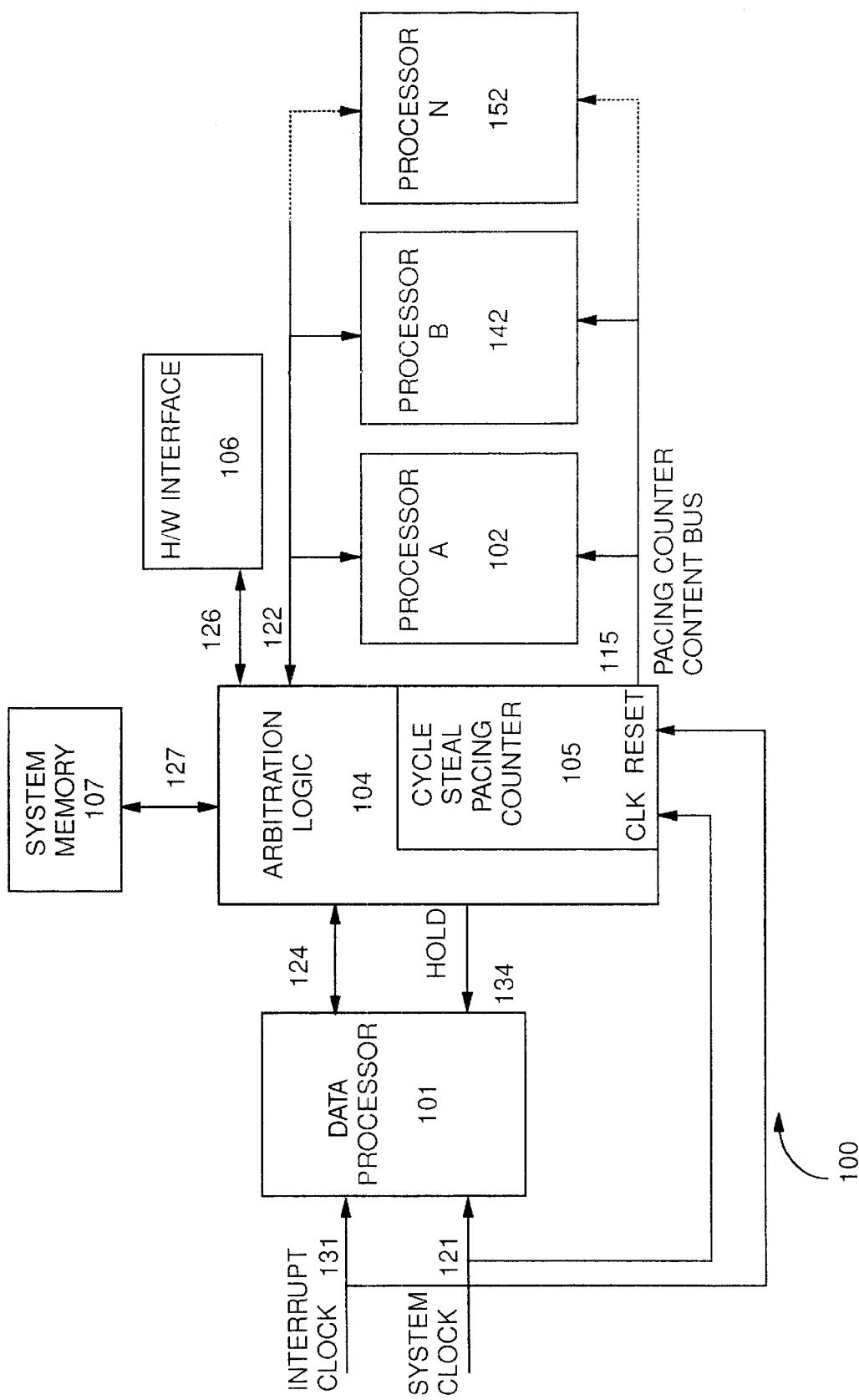
FIG. 1 illustrates a block diagram of an embodiment of a data processor system according to the present invention.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within he skills of persons of ordinary skill in the relevant art.

Refer now to the drawings wherein depicted elements are not necessarily shown to scale and wherein like or similar elements are designated by the same reference numeral through the several views.

An invention that alleviates the problem of cycle resources stolen from a data processor by asynchronous accesses from a second processor in a data processor system will now be described in detail. Refer now to FIG. 1, in which is depicted data processor system 100 in accordance with one embodiment of the present invention. Data processor system 100 is a multiprocessor system. One processor of data processor system 100 is data processor 101. In one embodiment of the invention, data processor 101 may be a digital signal processor (DSP). Operations of data processor 101 are driven by system clock signal 121. A second clock signal, an interrupt clock signal 131, is also provided to data processor 101. Interrupt clock 131 is used as a scheduling basis for the data tasks running in data processor 101. In one embodiment of the present invention, system clock signal 121 may run from one to three orders of magnitude faster than interrupt clock signal 131. However, it would be understood by one of ordinary skill in the art that system clock signal 121 and interrupt clock signal 131 may have any speed provided only that the speed of interrupt clock signal 131 is less than the speed of system clock signal 121.

Arbitration logic circuitry 104 mediates the access to system memory 107. Arbitration logic circuitry 104 communicates with system memory 107 via memory bus 127. Data processor 101 communicates with system memory 107 through arbitration logic circuitry 104. Data processor 101 is connected to arbitration logic circuitry 104 via system bus 124.

Arbitration logic circuitry 104 also mediates the access to system memory 107 by other processors requiring access to system memory 107. Data processor system 100 includes one or more additional processors, processor A 102 through processor N 152 where N represents a predetermined number of processors. Processor A 102 through processor N 152 communicate with arbitration logic 104 through interface bus 122. In one embodiment of the present invention, one of processor A 102 through processor N 152 may be a host processor.

Operations of processor A 102 through processor N 152 which require access to system memory 107 necessitate one of processor A 102 through processor N 152 stealing system cycle resources from data processor 101. During intervals of time in which any one of processor A 102, processor B 142 through processor N 152 is stealing cycle resources from data processor 101, arbitration logic circuitry 104 holds data processor 101, that is, causes instruction execution by the data processor to be stopped, by asserting data hold signal 134. Processor A 102, processor B 142, . . . , processor N 152 are permitted to steal cycle resources at a predetermined maximum rate called the "pacing counter threshold." The pacing counter threshold is defined by the maximum number of system cycles that processor A 102 through processor N 152, in the aggregate, are permitted to steal in an interval of time determined by the period of interrupt clock signal 131.

During a cycle resource access by any one of processor A 102 through processor N 152, cycle steal pacing counter 105 accounts for system clock cycles. In such a time interval, cycle steal pacing counter 105 is enabled by arbitration logic circuitry 104 issuing an enable signal thereto. Cycle steal pacing counter 105 receives system clock 121 and accumulates system clock cycles so long as cycle steal pacing counter 105 is enabled by arbitration logic circuitry 104. Cycle steal pacing counter 105 also receives interrupt clock signal 131. At the end of an interrupt clock signal 131 period, cycle steal pacing counter 105 resets. Thus, the maximum count contained in cycle steal pacing counter 105 represents, in any particular interval of interrupt clock signal 131, the rate of cycle resource steals by processor A 102 through processor N 152 per unit of time determined by the period of interrupt clock signal 131. The maximum cycle allocation per interval of interrupt clock signal 131 should be smaller than the size of cycle steal pacing counter 105.

The contents of cycle steal pacing counter 105 are used to limit cycle resource accesses by processor A 102 through processor N 152. The contents of cycle steal pacing counter 105 are provided to processor A 102 through processor N 152 via pacing counter content bus 115. Processor A 102 through processor N 152 may read the value of the contents of cycle steal pacing counter 105. Reading the value of the contents of cycle steal pacing counter 105 does not cause data processor 101 to be held, nor does it affect the value of the contents of cycle steal pacing counter 105 itself. The contents of cycle steal pacing counter 105 may be accessed by an external device through either I/O mapping or memory mapping. When I/O mapping is used to access the value, a register is accessed. When memory mapping is used to access the value, the contents of cycle steal pacing counter 105 are mapped to a memory location in a corresponding one of processor A 102 through processor N 152. When that memory location is accessed, the contents of cycle steal pacing counter 105 are then accessed. Software running on processor A 102 through processor N 152 then manages the stealing of cycle resources by processor A 102 through processor N 152 by reading the value stored in cycle steal pacing 105 in an external register or an internal memory space. The use of software for performing such read operations is well known in the data processing art and, therefore, will not be described in greater detail.

In one embodiment of the present invention employing a single access approach, the software running on processor A 102 through processor N 152 reads the contents of cycle steal pacing counter 105 before each access by one of processor A 102 through processor N 152. The value of the contents of cycle steal pacing counter 105 is then compared to the pacing counter threshold value. If the value of the contents of cycle steal pacing counter 105 is less than the pacing counter threshold value, that processor, of processor A 102 through processor N 152, seeking access continues with the access operation. Otherwise, that processor of processor A 102 through processor N 152 seeking access, continues to read the value of the contents of cycle steal pacing counter 105 or performs other tasks until the value of the contents of cycle steal pacing counter 105 is reset to zero by the action of interrupt clock signal 131, described hereinabove. It should be noted that it is possible for accesses to data processing resources to not result in a cycle steal operation. When a cycle is not stolen, cycle steal pacing counter 105 is not incremented.

In another embodiment of the present invention employing a block access approach, one of processor A 102 through processor N 152 seeks access to system cycle resources in order to read or write a block of data values to system memory 107. In such an embodiment, processor A 102 through processor N 152 reduces the number of input/output (I/O) operations for transfer by reading the contents of cycle steal pacing counter 105 at the beginning of the block transfer, and calculating the worst case number of accesses into system memory 107 before the contents of cycle steal pacing counter 105 must be checked again. This calculation is done by subtracting the value of the contents of cycle steal pacing counter 105 from the pacing counter threshold value. The result of this calculation is used as a loop count. At the end of the loop, that processor, of processor A 102 through processor N 152, accessing system cycle resources again reads the value of the contents of cycle steal pacing counter 105, and repeats the process just described. So long as the value of the contents of cycle steal pacing counter 105 is less than the pacing counter threshold value, that processor, of processor A 10 through processor N 152, accessing system cycle resources may continue its accesses to system cycle resources. Otherwise, that processor, of processor A 102 through processor N 152, accessing system cycle resources must wait and continue to poll cycle steal pacing counter 105 or perform other tasks until the value of the contents of cycle steal pacing counter 105 is reset to zero. This process is repeated until the entire block of data values is transferred.

It should be noted that data processor system 100 may include hardware (H/W) interface 106 for coupling ancillary hardware devices (not shown in FIG. 1) to data processor system 100.

In data processor system 100, cycle steal counter 105 is depicted as being incorporated in arbitration logic circuitry 104. However, it would be understood by one of ordinary skill in the art that other embodiments of the present invention might implement cycle steal counter 105 as structure standing separate from arbitration logic circuitry 104. One such embodiment is illustrated in FIG. 2.

Figure 2:
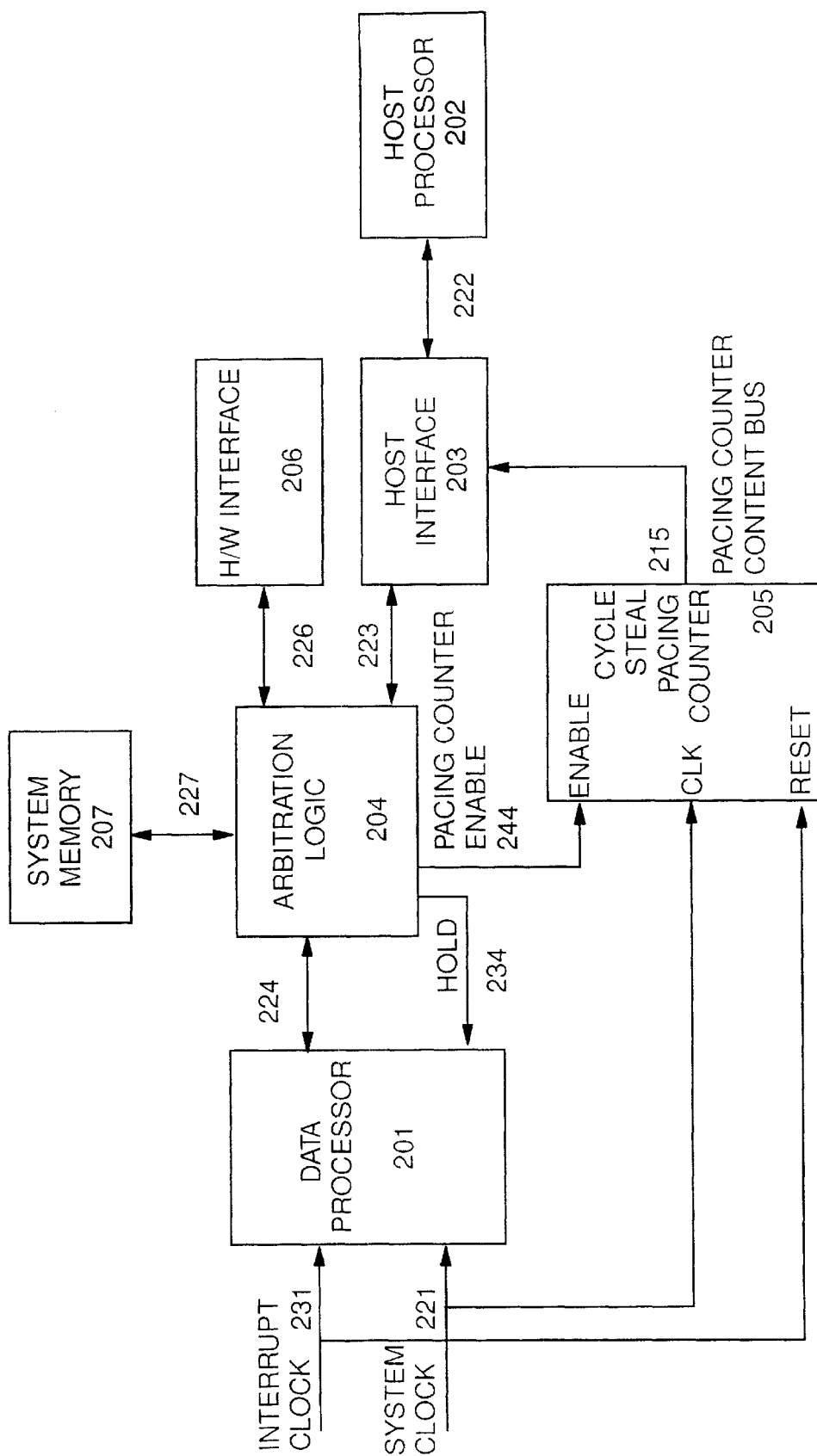
FIG. 2 illustrates a block diagram of another embodiment of a data processor system according to the present invention.

Referring now to FIG. 2, in which is depicted data processor system 200, in accordance with another embodiment of the present invention As described hereinabove, operations of data processor 201 are driven by system clock signal 221, and interrupt clock signal 231 is used as a scheduling mechanism for the data tasks running in data processor 201.

Similarly, arbitration logic circuitry 204 mediates accesses to system memory 207 by devices requiring access thereto. Arbitration logic circuitry 204 communicates with system memory 207 via memory bus 227. Data processor 201 communicates with system memory 207 through arbitration logic circuitry 204. Data processor 201 communicates with arbitration logic circuitry 204 via system bus 224. Arbitration logic circuitry 204 also mediates the access to system memory 207 by another processor requiring access to system memory 207.

In the embodiment depicted in FIG. 2, data processor system 200 includes host processor 202 which can gain access to system memory 207 via arbitration logic circuitry 204. Host processor 202 communicates with arbitration logic circuitry 204 through host interface 203. Information is transmitted between host interface 203 and host processor 202 via host interface bus 222. In one embodiment, host interface bus 222 may be an Industry Standard Architecture (ISA) bus. In another embodiment, host interface bus 222 may be a Peripheral Component Interconnect (PCI) bus. It would also be understood by one of ordinary skill in the art that any other standard interface bus may also be used. Host interface circuitry 203 is coupled to arbitration logic circuitry 204 via host interface system bus 223.

Operations of host processor 202 which require access to system memory 107 necessitate host processor 202 stealing system cycle resources from data processor 201. During such cycle steal events, the operation of data processor system 200 is as described hereinabove with respect to data processor system 100, the embodiment depicted in FIG. 1.

Cycle steal pacing counter 205 receives system clock 221 and accumulates system clock cycles so long as cycle steal pacing counter 205 is enabled by arbitration logic circuitry 204. Cycle steal pacing counter 205 also receives interrupt clock signal 231. At the end of an interrupt clock signal 231 period, cycle steal pacing counter 205 resets. The contents of cycle steal pacing counter 205 are used to limit cycle resource accesses by host processor 202. The contents of cycle steal pacing counter 205 are provided to host processor 202 via pacing counter content bus 215, host interface 203 and host interface bus 203. Software running on processor host processor 202 then manages the stealing of cycle resources by host processor 202. One embodiment of the present invention may employ the single access approach described hereinabove. Another embodiment may employ the block access approach also described hereinabove.

In data processor system 200, system memory 207 is shown as an integrated system memory. However, it would be understood by an artisan of ordinary skill that other embodiments of the present invention may employ other system memory architectures. One such embodiment is depicted in FIG. 3.

Figure 3:
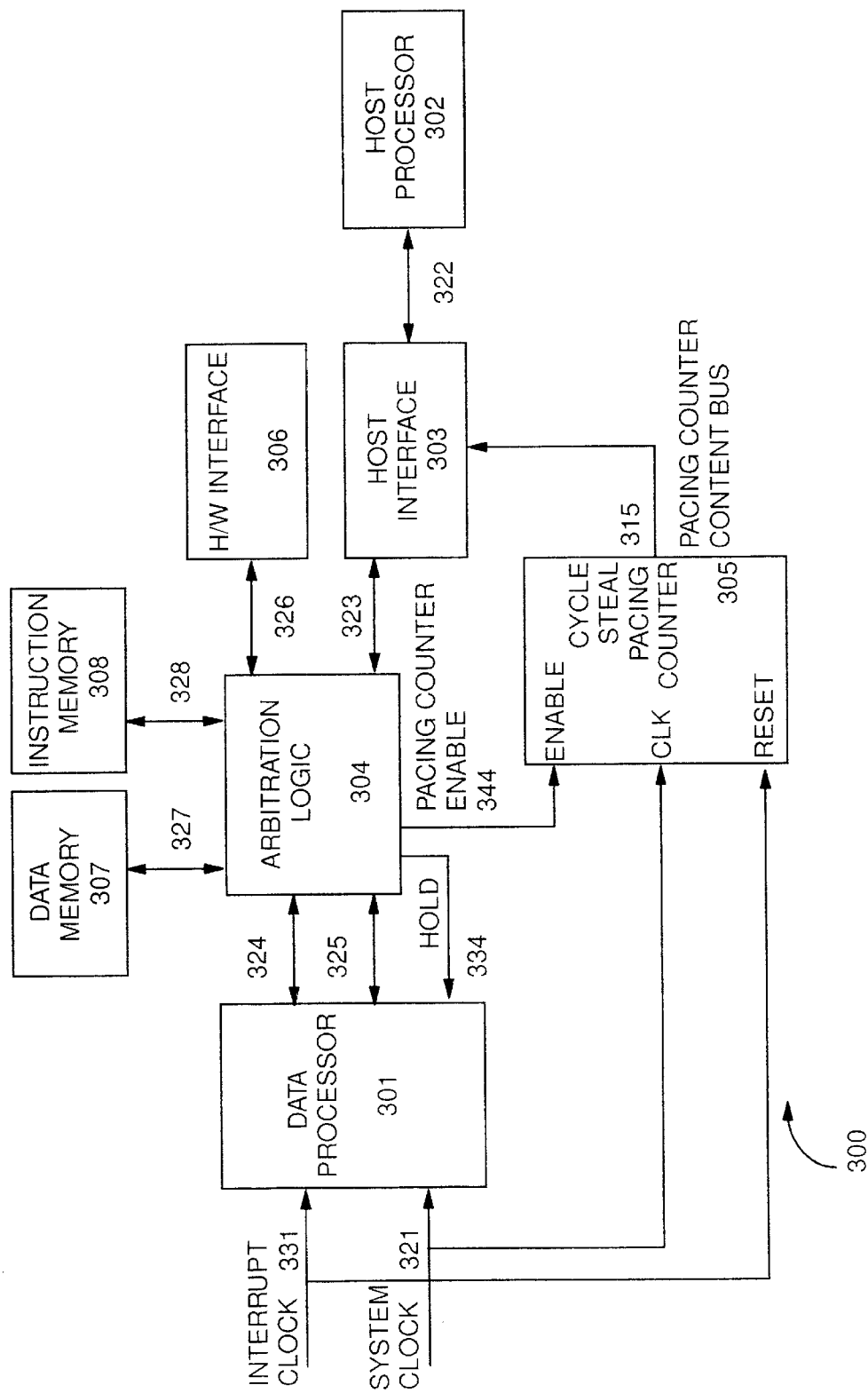
FIG. 3 illustrates a block diagram of a third embodiment of a data processor system according to the present invention.

Referring now to FIG. 3 in which yet another embodiment of the invention, data processor system 300 is illustrated. Data processor system 300 employs a so-called Harvard architecture, having data memory 307 and instruction memory 308. Harvard architectures are well-known in the data processing arts and, therefore will not be described in greater detail. Arbitration logic 304 communicates with data memory 307 via data memory bus 327, and communicates with instruction memory 308 via instruction memory bus 328. Data processor 301 accesses data memory 307 via arbitration logic 304 through system data bus 324. Access to instruction memory 308 by data processor 301 via arbitration logic circuitry 304, is through system instruction bus 325.

It would be understood by one of ordinary skill in the art, that in all other respects the operation of data processor system 300 is the same as in the other embodiments heretofore described. Moreover, it would also be understood by one of ordinary skill in the art that other embodiments of the present invention may employ the structures illustrated herein in different combinations. For example, the Harvard architecture memory of data processor system 300 in FIG. 3 may appear in an embodiment of data processor system 100 depicted in FIG. 1. An artisan of ordinary skill would understand that all such variations would constitute embodiments of the present invention.

Although the present invention and its advantages have been described in detail, it should be understood that various changes, substitutions and alterations can be made herein without departing from the spirit and scope of the invention as defined by the appended claims.

What is claimed is:

1. A method of cycle tracking and allocation in a data processor system comprising the steps of:

i. generating an accumulated system cycle count data value, in a preselected interval of time, by accumulating system cycle counts during which a data processor is being held to permit cycle resource access by one or more other processors;

ii. comparing said accumulated system cycle count data value with a predetermined pacing counter threshold value; and iii. limiting cycle resource access by said one or more other processors when said accumulated system cycle count data value exceeds said predetermined pacing counter threshold value wherein said step of ii., and said iii., further comprise the steps of:

reading said accumulated system cycle count data value before a cycle resource access;

comparing said accumulated system cycle count data value with said predetermined pacing count threshold value;

continuing with said cycle resource access when said accumulated system cycle count data value does not exceed said predetermined pacing count threshold value; and continuing to selectively perform one of a read operation of said accumulated system cycle count data value and an alternate task until a reset to a value of zero of said accumulated system cycle count data value occurs when said accumulated system cycle count data value exceeds said predetermined pacing count threshold value.

2. The method of cycle tracking and allocation in a data processor system of claim 1 wherein said step of ii., and said step of iii., further comprise the steps of:

subtracting said accumulated system cycle count data value from said predetermined pacing counter threshold value, said step of subtracting said accumulated system cycle count data value from said predetermined pacing counter threshold value forming a loop index;

performing a cycle resource access and decrementing said loop index, said step of performing a cycle resource access and decrementing said loop index being repeated until said loop index reaches a value of zero when said loop index is positive; and selectively reading said accumulated system cycle count data value and selectively performing an alternate task until said accumulated system cycle count data value is reset to a value of zero when said loop index is not positive.

* * * * *